(12) United States Patent
Lei et al.

(10) Patent No.: US 11,218,051 B2
(45) Date of Patent: Jan. 4, 2022

(54) QUICK ASSEMBLY STRUCTURE USED FOR LINEAR DRIVER

(71) Applicant: OKIN Refined Electric Technology Co., Ltd, Jiaxing (CN)

(72) Inventors: Minglong Lei, Jiaxing (CN); Long Li, Jiaxing (CN); Chenjian Lei, Jiaxing (CN)

(73) Assignee: DewertOkin Technology Group Co. Ltd.

( * ) Notice: Subject to any disclaimer, the term of this patent is extended or adjusted under 35 U.S.C. 154(b) by 391 days.

(21) Appl. No.: 16/379,810

(22) Filed: Apr. 10, 2019

(65) Prior Publication Data
US 2019/0372484 A1    Dec. 5, 2019

(30) Foreign Application Priority Data

May 29, 2018  (CN) .......................... 201820813650.1
Nov. 20, 2018 (CN) .......................... 201821909275.7

(51) Int. Cl.
| | | |
|---|---|---|
| H02K 5/22 | (2006.01) |
| H02N 2/00 | (2006.01) |
| H02K 5/04 | (2006.01) |
| H02K 41/02 | (2006.01) |
| H02N 2/06 | (2006.01) |

(52) U.S. Cl.
CPC ............... *H02K 5/225* (2013.01); *H02K 5/04* (2013.01); *H02K 41/02* (2013.01); *H02N 2/001* (2013.01); *H02N 2/0055* (2013.01); *H02N 2/06* (2013.01)

(58) Field of Classification Search
CPC .......... H02K 5/225; H02K 5/04; H02K 41/02; H02K 7/06; H02N 2/06; H02N 2/001; H02N 2/0055
See application file for complete search history.

(56) References Cited

U.S. PATENT DOCUMENTS

2015/0280511 A1* 10/2015 Schweichart ............ H02K 5/10
                                                              310/88
2018/0320413 A1* 11/2018 Wong .................... E05B 53/008

* cited by examiner

*Primary Examiner* — Emily P Pham

(57) ABSTRACT

A quick assembly structure used for a linear driver includes a motor, an upper shell and a lower shell. The motor is combined with the lower shell through a clamping mechanism, and the lower shell is covered with the upper shell.

19 Claims, 3 Drawing Sheets

QUICK ASSEMBLY STRUCTURE USED FOR LINEAR DRIVER

CROSS REFERENCE TO THE RELATED APPLICATIONS

This application is based upon and claims priority to Chinese Patent Application No. 201820813650.1, filed on May 29, 2018, and Chinese Patent Application No. 201821909275.7, filed on Nov. 20, 2018, the entire contents of which are incorporated herein by reference.

TECHNICAL FIELD

The invention relates to a quick assembly structure used for a linear driver.

BACKGROUND

Motors of existing linear drivers are generally perpendicular to the power output direction of the linear drivers. In the prior art, when motors and shells are assembled, screw holes of the motors and the shells are aligned first, and then the motors and the shells are tightened and fixed together with screws. Due to the fact that multiple screws need to be tightened when the motors and the shells are assembled, the assembly efficiency is low, and the manufacturing cost is high.

SUMMARY

The objective of the invention is to provide a quick assembly structure which is used for a linear driver and is simple and reasonable in design and high in assembly efficiency.

According to the technical scheme adopted by the invention, a quick assembly structure used for a linear driver comprises a motor, an upper shell and a lower shell, wherein the motor is combined with the lower shell through a clamping mechanism, and the lower shell is covered with the upper shell.

Furthermore, the clamping mechanism comprises hooks arranged on an upper end face of the motor and holes formed in the lower shell, wherein the hooks are inserted into the holes and are then rotated to firmly hook outer edges of the holes, and a fastener penetrates through the upper shell and the lower shell to be connected with the upper end face of the motor in a threaded manner.

Furthermore, the clamping mechanism comprises hooks arranged on the upper end face of the motor and holes formed in the lower shell, wherein the number of the holes is at least two, a pit is formed in a side face of the motor, the lower shell is provided with an elastic protrusion corresponding to the pit, the hooks are inserted into the holes and are then rotated to firmly clamp outer edges of the holes, and then the elastic protrusion is inlaid in the pit.

Furthermore, an electrode contact is arranged on the upper end face of the motor, and an electrode plate corresponding to the electrode contact is arranged on the lower shell.

Furthermore, the lower shell is provided with a concave part used for mounting the electrode contact, and the electrode contact is arranged in the concave part and is fixed to the lower shell.

Furthermore, the electrode contact is an electric contact, and the electrode plate is a flat plate.

Furthermore, the electrode contact is a round contact, the electrode plate is an annular structure provided with an opening, and when the electrode contact and the electrode plate are turned on, the round contact enters the annular structure.

Furthermore, an insulating pad is arranged between the electrode contact and the upper end face of the motor.

Furthermore, the upper end face of the motor is made from a metal material, and the hooks are integrally formed on the upper end face of the motor through punching.

Furthermore, the upper shell is provided with crescent buckles, the lower shell is provided with crescent grooves, and when the lower shell is covered with the upper shell, the crescent buckles are firmly hooked in the crescent grooves.

Furthermore, the lower shell comprises a cylinder and an end face, wherein the end face is fixedly connected with the cylinder, the holes are formed in the end face, the elastic protrusion is arranged on the cylinder, and the inner diameter of the cylinder is matched with the outer diameter of the motor.

Compared with the prior art, the invention has the following advantages and effects:

When the structure is assembled, the hooks fall into the holes and are then rotated by a certain angle to rapidly assemble the motor and the lower shell together, the structure is stable and reliable after being assembled, and compared with the prior art, the assembly efficiency is greatly improved.

DETAILED DESCRIPTION OF THE EMBODIMENTS

The invention is further expounded below with reference to the accompanying drawings and embodiments. The following embodiments are used to explain the invention, but are not intended to limit the invention.

Embodiment 1

Figure 1:
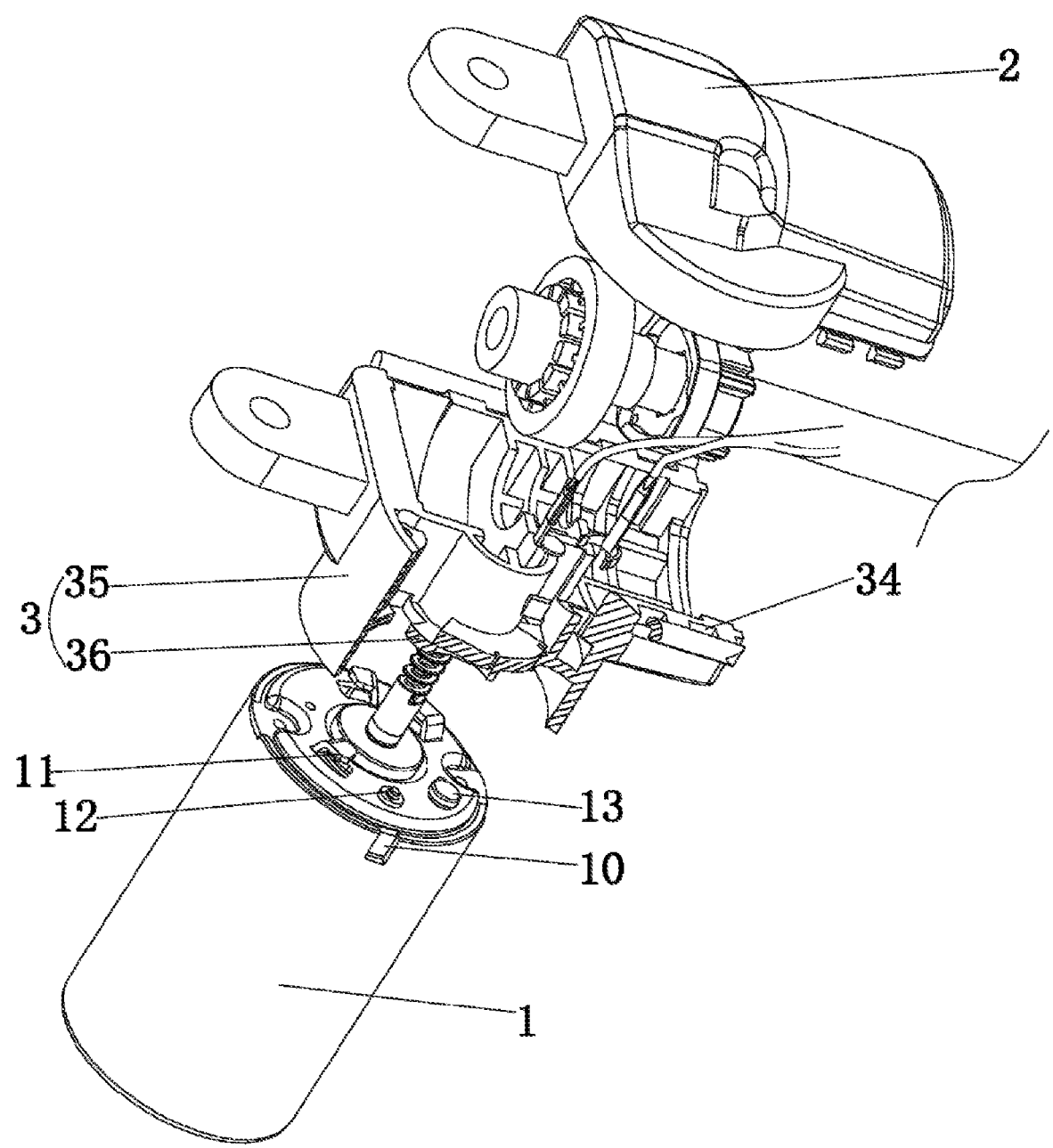
FIG. 1 is an exploded view of the invention.
Figure 2:
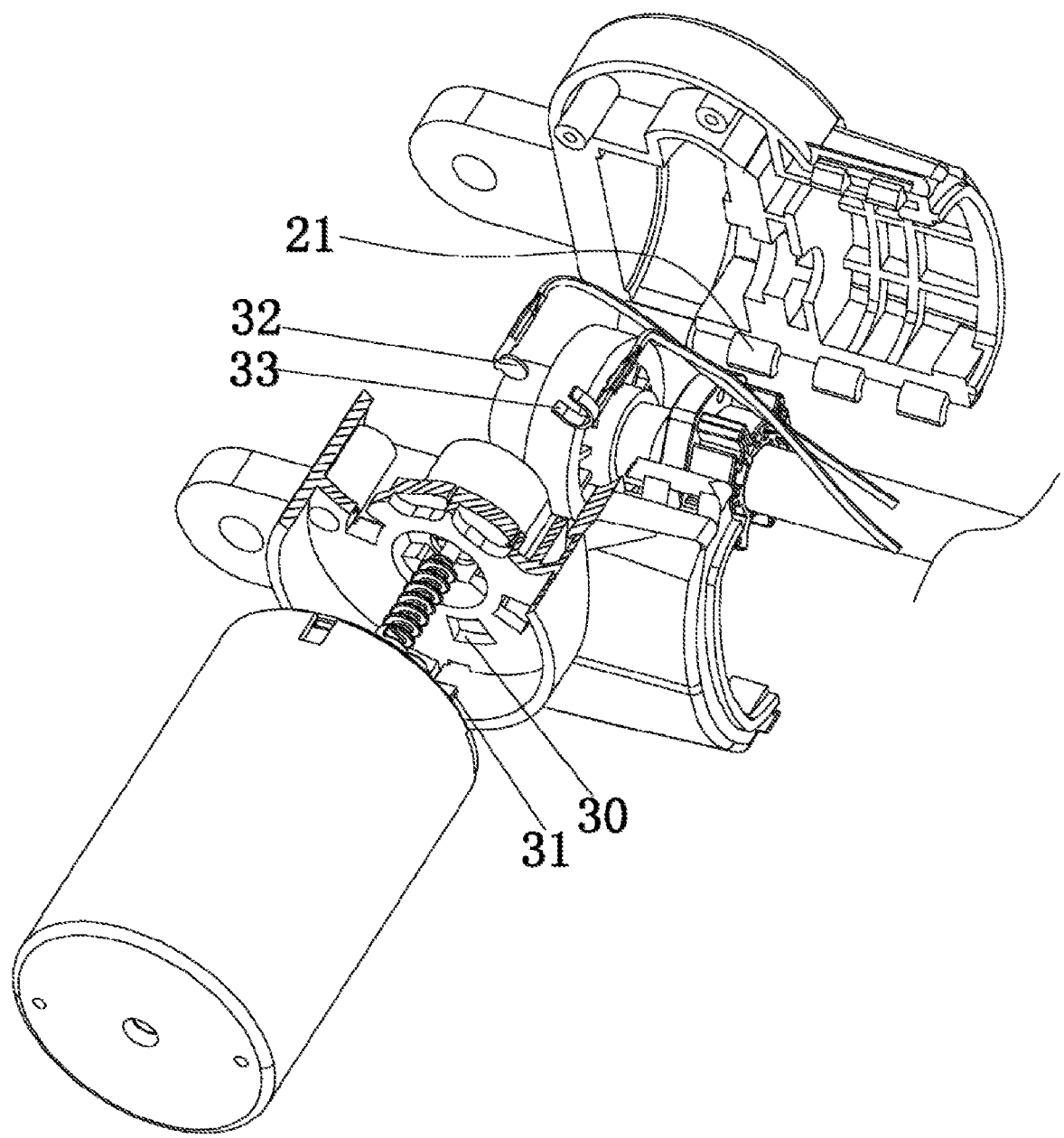
FIG. 2 is another structural view of FIG. 1.
Figure 3:
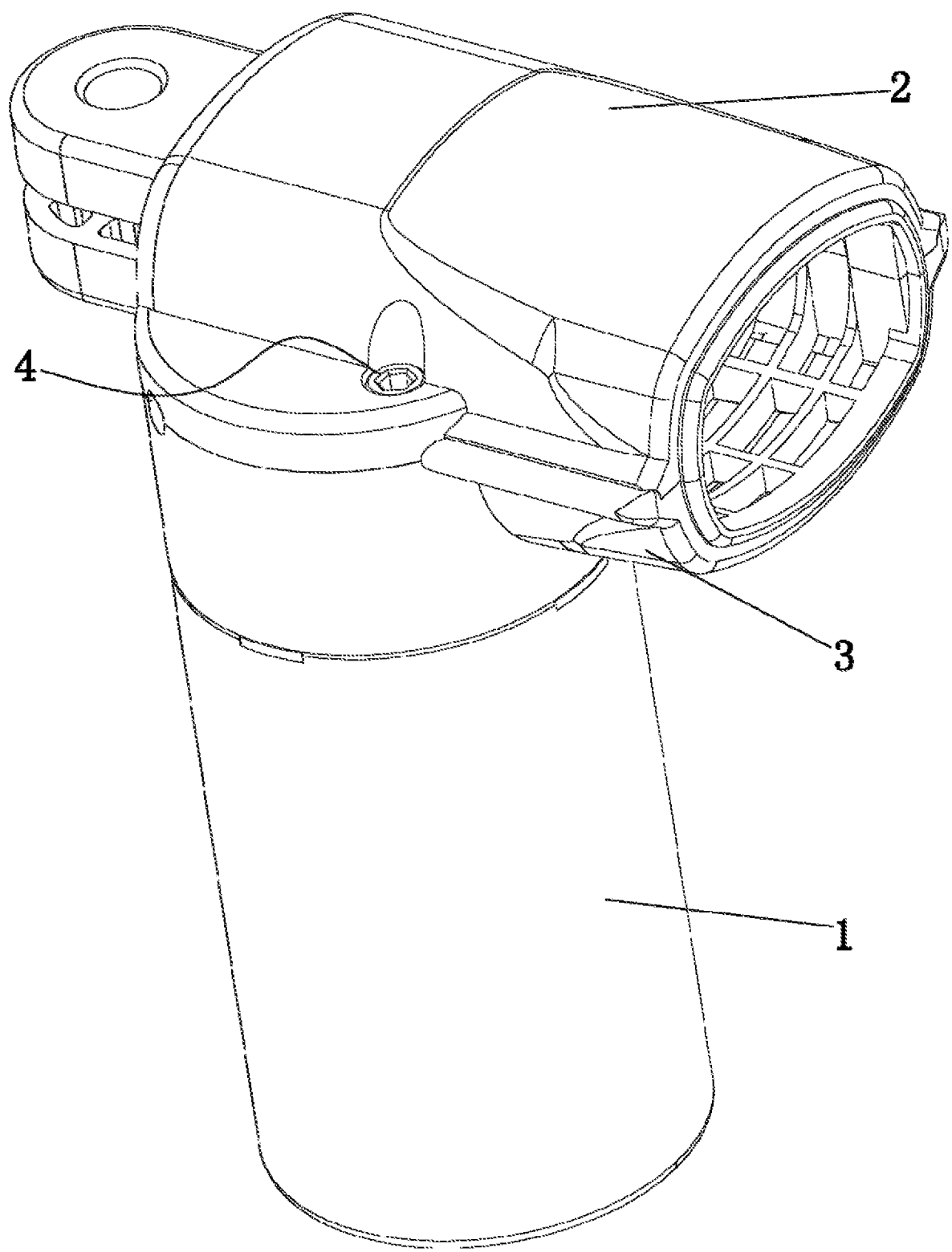
FIG. 3 is an assembled view of the invention.

As shown in FIG. 1 and FIG. 2, a quick assembly structure used for a linear driver comprises a motor 1, an upper shell 2 and a lower shell 3, wherein the motor 1 is combined with the lower shell 3 through a clamping mechanism, and the lower shell 3 is covered with the upper shell 2.

In this embodiment, the clamping mechanism comprises hooks 11 arranged on an upper end face of the motor 1 and holes 30 formed in the lower shell 3, wherein the number of the holes 30 is at least two. A pit 10 is formed in a side face of the motor 1. The lower shell 3 is provided with an elastic protrusion 31 corresponding to the pit 10. The hooks 11 are inserted into the holes 30 and are then rotated to firmly hook outer edges of the holes 30, and then the elastic protrusion 31 is inlaid in the pit 10. The hooks 11 firmly clamp the outer edges of the holes 30 to realize vertical fixation, and the elastic protrusion 31 is inlaid in the pit 10 to realize circumferential fixation.

According to another connection manner, the hooks 11 are inserted into the holes 30 and are then rotated to firmly hook the outer edges of the holes 30, and a fastener 4 penetrates through the upper shell 2 and the lower shell 3 to be connected with the upper end face of the motor 1 in a threaded manner. Preferably, the fastener 4 is a screw. The structure is stable and reliable after being assembled.

In order to further improve the assembly efficiency and to realize electrical connection after assembly, an electrode contact is arranged on the upper end face of the motor 1, and an electrode plate corresponding to the electrode contact is arranged on the lower shell 3.

In order to improve the stability and accuracy of electrical connection, the lower shell 3 is provided with a concave part used for mounting the electrode plate, and the electrode plate is arranged in the concave part and is fixed to the lower shell 3 through injection molding. The electrode plate is embedded in the lower shell 3 while the lower shell 3 is injection molded.

In this embodiment, the electrode contact is an elastic contact 12, the electrode plate is a flat plate 32, and the electrode contact and the electrode plate are electrically connected tightly.

According to another implementation for electrical connection between the electrode contact and the electrode plate, the electrode contact is a round contact 13, the electrode plate is an annular structure 33 provided with an opening, and when the electrode contact and the electrode plate are turned on, the round contact 13 enters the annular structure 33.

In this embodiment, an insulating pad is arranged between the electrode contact and the upper end face of the motor 1.

In this embodiment, the upper end face of the motor 1 is made from a metal material, and the hooks 11 are integrally formed on the upper end face of the motor 1 through punching. In this scheme of the structure, the hooks 11 are parts of the upper end face of the motor 1 and are integrated with the motor 1, so that material resources are effectively used, and meanwhile, good stability of the hooks 11 is ensured.

In this embodiment, the upper shell 2 is provided with crescent buckles 21, the lower shell 3 is provided with crescent grooves 34, and when the lower shell 3 is covered with the upper shell 2, the crescent buckles 21 are firmly hooked in the crescent grooves 34.

In this embodiment, the lower shell 3 comprises a cylinder 35 and an end face 36, wherein the end face 36 is fixedly connected with the cylinder 35, the holes 30 are formed in the end face 36, the elastic protrusion 31 is arranged on the cylinder 35, and the inner diameter of the cylinder 35 is matched with the outer diameter of the motor 1.

The above embodiments in the specification are only illustrative ones of the invention. Various modifications, supplements or similar substitutes of these specific embodiments made by those skilled in this field without deviating from the contents in the specification or going beyond the scope defined by the claims should also fall within the protection scope of the invention.

What is claimed is:

1. A quick assembly structure used for a linear driver, comprising: a motor, an upper shell, and a lower shell; wherein the motor is combined with the lower shell through a clamping mechanism, and the lower shell is covered with the upper shell; wherein the clamping mechanism comprises a plurality of hooks arranged on an upper end face of the motor and a plurality of holes formed in the lower shell, and the plurality of hooks are inserted into the plurality of holes and are then rotated to firmly clamp outer edges of the plurality of holes.

2. The quick assembly structure used for the linear driver according to claim 1, wherein a fastener penetrates through the upper shell and the lower shell to be connected to the upper end face of the motor in a threaded manner.

3. The quick assembly structure used for the linear driver according to claim 1, wherein a number of the plurality of holes is at least two, a pit is formed in a side face of the motor, the lower shell is provided with an elastic protrusion corresponding to the pit, and the elastic protrusion is inlaid in the pit.

4. The quick assembly structure used for the linear driver according to claim 1, wherein an electrode contact is arranged on an upper end face of the motor, and an electrode plate corresponding to the electrode contact is arranged on the lower shell.

5. The quick assembly structure used for the linear driver according to claim 1, wherein the lower shell is provided with a concave part used for mounting an electrode plate, and the electrode plate is arranged in the concave part and is fixed to the lower shell.

6. The quick assembly structure used for the linear driver according to claim 4, wherein the electrode contact is an elastic contact, and the electrode plate is a flat plate.

7. The quick assembly structure used for the linear driver according to claim 4, wherein the electrode contact is a round contact, the electrode plate is an annular structure provided with an opening, and when the electrode contact and the electrode plate are turned on, the round contact enters the annular structure.

8. The quick assembly structure used for the linear driver according to claim 4, wherein an insulating pad is arranged between the electrode contact and the upper end face of the motor.

9. The quick assembly structure used for the linear driver according to claim 1, wherein an upper end face of the motor is made of a metal material, and a plurality of hooks are integrally formed on the upper end face of the motor through a punching.

10. The quick assembly structure used for the linear driver according to claim 1, wherein the upper shell is provided with a plurality of crescent buckles, the lower shell is provided with a plurality of crescent grooves, and when the lower shell is covered with the upper shell, the plurality of crescent buckles are firmly hooked in the plurality of crescent grooves.

11. The quick assembly structure used for the linear driver according to claim 4, wherein the lower shell comprises a cylinder and an end face, the end face is fixedly connected to the cylinder, a plurality of holes are formed in the end face, an elastic protrusion is arranged on the cylinder, and an inner diameter of the cylinder is matched with an outer diameter of the motor.

12. The quick assembly structure used for the linear driver according to claim 1, wherein an electrode contact is arranged on the upper end face of the motor, and an electrode plate corresponding to the electrode contact is arranged on the lower shell.

13. The quick assembly structure used for the linear driver according to claim 2, wherein an electrode contact is arranged on the upper end face of the motor, and an electrode plate corresponding to the electrode contact is arranged on the lower shell.

14. The quick assembly structure used for the linear driver according to claim 3, wherein an electrode contact is arranged on the upper end face of the motor, and an electrode plate corresponding to the electrode contact is arranged on the lower shell.

15. The quick assembly structure used for the linear driver according to claim 1, wherein the lower shell is provided with a concave part used for mounting an electrode plate, and the electrode plate is arranged in the concave part and is fixed to the lower shell.

16. The quick assembly structure used for the linear driver according to claim 2, wherein the lower shell is provided with a concave part used for mounting an electrode plate, and the electrode plate is arranged in the concave part and is fixed to the lower shell.

17. The quick assembly structure used for the linear driver according to claim 3, wherein the lower shell is provided with a concave part used for mounting an electrode plate, and the electrode plate is arranged in the concave part and is fixed to the lower shell.

18. The quick assembly structure used for the linear driver according to claim 12, wherein the electrode contact is an elastic contact, and the electrode plate is a flat plate.

19. The quick assembly structure used for the linear driver according to claim 13, wherein the electrode contact is an elastic contact, and the electrode plate is a flat plate.

\* \* \* \* \*